March 5, 1968

B. C. MILLER ET AL 3,371,429

MATERIAL PROCESSING TOWER

Filed May 9, 1966

INVENTOR
BOYD C. MILLER
SAMUEL A. COOPER, JR.

BY

*Clifton T Hunt Jr*

ATTORNEY

INVENTOR
BOYD C. MILLER
SAMUEL A. COOPER, JR.

United States Patent Office 3,371,429
Patented Mar. 5, 1968

3,371,429
MATERIAL PROCESSING TOWER
Boyd C. Miller and Samuel A. Cooper, Salisbury, N.C., assignors to Miller Equipment Company, Salisbury, N.C., a corporation of North Carolina
Filed May 9, 1966, Ser. No. 548,779
8 Claims. (Cl. 34—171)

ABSTRACT OF THE DISCLOSURE

This invention relates to a material processing tower for the treatment of granular or particulate material wherein the material passes through a series of cones and funnels in a sinuous path.

The invention is susceptible of a wide variety of uses including the drying of shale or clay under high temperatures, the drying of grain, or the freezing of peas. The refractory drying of particulate material such as clay or shale under high temperature is one of the principal uses of the invention and while the invention is not limited to this use, it will be described in this context for the purposes of illustration.

Difficulty has been encountered in the past in subjecting the individual granules or particles of material being processed under high temperatures to uniform heat during processing of the material. In some cases open flames have been employed within the processing enclosure which in some instances impinge directly on some of the particles or granules being processed but do not impinge on others. This results in a lack of uniformity in the physical characteristics of individual particles being processed which in turn contributes to a lower grade or poorer quality of material in a finished product, such as brick.

Difficulty has also been encountered in the past in creating undesirable quantities of dust in drying clay with known apparatus and according to known methods.

It is an object of this invention to provide an apparatus for the processing of granular or particulate material wherein provision is made for overcoming the disadvantages encountered in the use of prior known apparatus. It is a more specific object of this invention to provide an apparatus of the type described wherein a heat transfer chamber is an integral part of but physically located exteriorly of the tower wherein the material is processed.

It is another object of this invention to provide a reaction or drying tower of the type described wherein means are provided for introducing the processing or treating gases to the tower in successive stages and for controlling the temperature of the gases at their point of entry into the tower to achieve a controlled uniform or variable temperature throughout the tower as desired.

It is another object of the invention to provide a material processing tower of the type described that includes means for uniformly subjecting the granules or particles comprising the material being processed to the uniform temperature or selectively variant temperatures delivered into the processing tower from the heat transfer chamber.

Some of the objects of the invention having been stated, other objects will appear to those skilled in the art as the description proceeds, when taken in conjunction with the accompanying drawings, in which.

Figure 1:
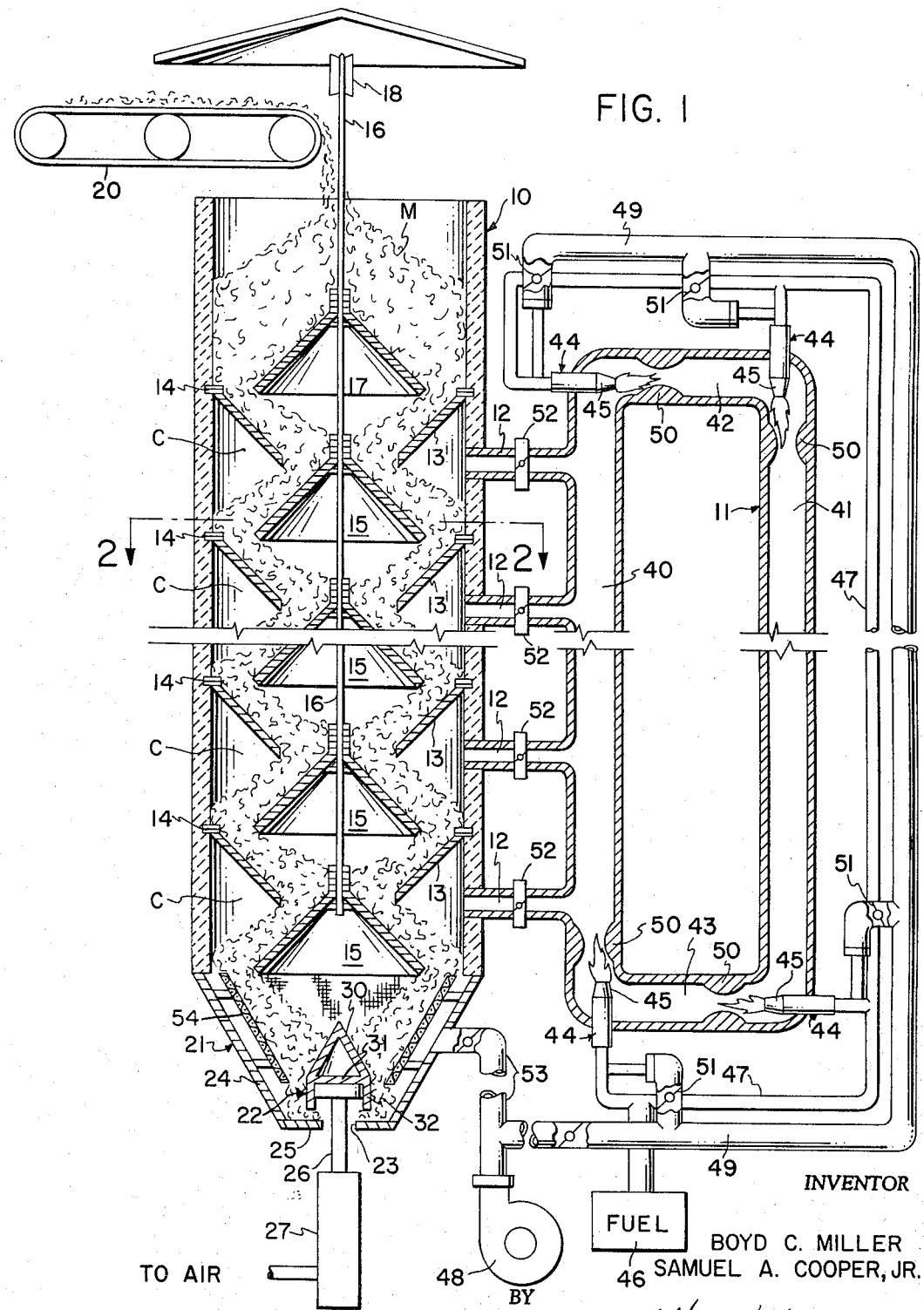
FIGURE 1 is a vertical sectional view, with parts broken away, of the material processing tower and the associated heat transfer chamber of this invention.

With reference to FIGURE 1 of the drawings, the numeral 10 broadly indicates a generally cylindrical open ended, vertically disposed tower within which granular material is processed according to the invention. A heat transfer chamber 11 is located exteriorly of the tower 10 and preferably comprises a closed circuit or continuous loop within which gases are heated or cooled prior to their delivery to the processing tower 10 through a plurality of conduits 12.

The tower 10 is equipped with a plurality of superposed inverted frusto-conical funnels 13. An annular flange 14 extends about the upper end of each funnel 13, the flanges of the funnels being fixed in sealing engagement with the inner surface of the tower 10 to support the funnels 13 in fixed vertically spaced relation to each other. The open lower end of each funnel 13 is selectively closable by a vertically movable cone 15, there being a cone 15 operatively associated with the opening in the lower end of each funnel 13.

The cones 15 are supported for vertical reciprocation relative to the funnels 13 by any suitable means such as a chain or cable 16 as schematically illustrated in FIGURE 1. One end of the chain 16 is connected to the lowermost cone 15 and the rest of the cones 15 are secured to the chain 16 in fixed vertically spaced relation to each other. The other end of the chain 16 is connected to a winch or hoist 18 or other suitable powered device at the top of the tower whereby the cones 15 may be adjusted as desired to vary the size of the openings in the funnels 13. The cones may be adjusted during processing of the material, and the cable 16 may be manipulated to jiggle or reciprocate the cones as an aid to passage of material through the tower.

Figure 3:
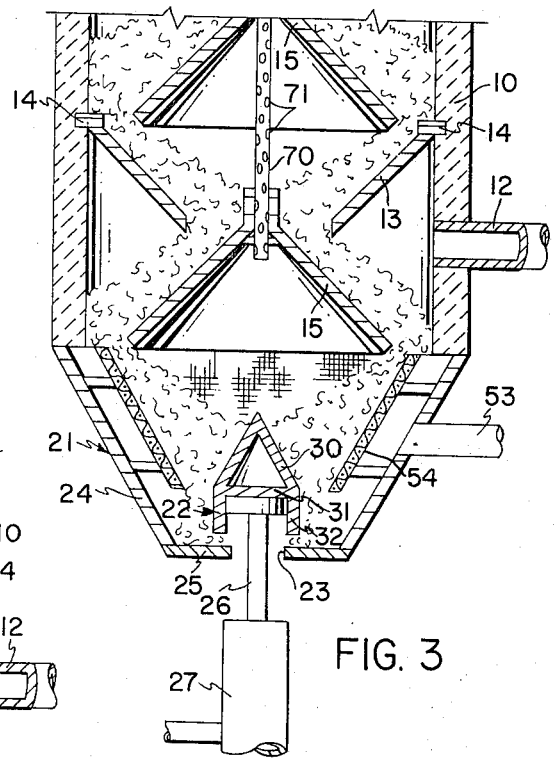
FIGURE 3 is an enlarged vertical sectional view of the base of the tower showing the valve in closed position to shut off the flow of material, and illustrating a first modification of the invention.
Figure 4:
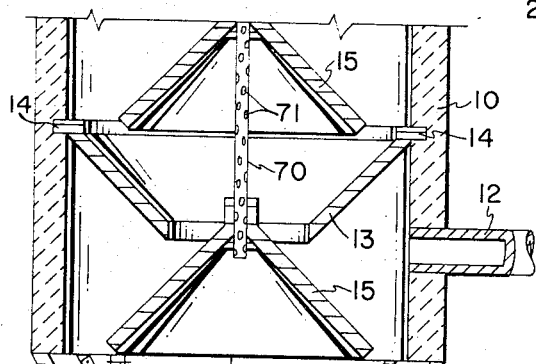
FIGURE 4 is a view similar to FIGURE 3 but showing the valve in open position.

A deflector cone 17 is provided above the topmost funnel 13 adjacent the top of the tower 10. The deflector cone 17 is fastened to the cable 16 like the cones 15 and is movable therewith. Deflector cone 17 evenly distributes the incoming granular material or particles M delivered into the top of the tower by a conveyor schematically illustrated at 20. Assuming the cones 15 to be arranged to open the funnels 13 as shown in FIGURE 1, material M delivered by the conveyor 20 into the top of the tower 10 proceeds by gravity through successive chambers C beneath respective funnels 13 in the tower to its open-ended truncated base 21. A valve 22 controls the size of the opening 23 in the lower end of base 21 and may be manipulated to shut off the flow of material as shown in FIGURE 3 or opened as shown in FIGURE 4 to control the rate of flow of material from the tower. In normal operation it is contemplated that the valve 22 will be open so that the processing of material M will be a continuous operation.

Figure 7:
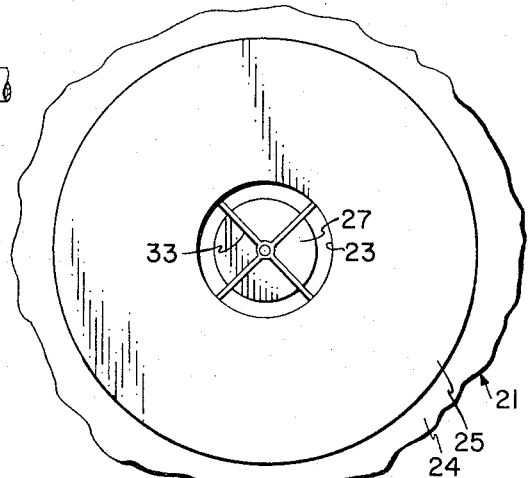
FIGURE 7 is an inverted plan view looking up at the bottom of FIGURE 6.
Figure 6:
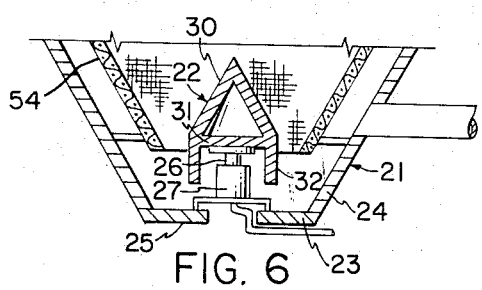
FIGURE 6 is an enlarged sectional view of the valve assembly illustrating a preferred installation of the actuating mechanism.

The truncated base 21 is of inverted conical configuration and comprises inwardly and downwardly sloping walls 24 and a horizontally disposed closure plate 25 which forms a seat for the valve 22 and through which the opening 23 extends. The valve 22 includes an upper cap 30 of inverted conical configuration with a sharpened apex at its upper end to facilitate reciprocal vertical movement of the valve through the mass of material within the base. A horizontal web 31 extends across the base of the cap 30 and is formed integral with a vertically extending annular flange 32. The free lower edge of the flange 32 is movable into engagement with the upper surface of closure plate 25 to close the interior of base 21 from communication with the atmosphere. The valve 22 is supported for vertical reciprocation on a piston 26 of an air cylinder 27 connected to a suitable source of compressed air. The outer end of the piston 26 is fixed to the web 31 and the cylinder 27 is supported in a desired manner beneath the valve. The cylinder is preferably supported directly beneath the valve and within the base 21 by a spider 33 which extends across the opening 23 and is supported by the closure plate 25 (FIGURES 6 and 7). Material M passes about the spider 33 and through opening 23 when valve 22 is opened (FIGURE 4).

The angular disposition of the cones 15 and the funnels 13 is an important aspect of this invention. Each of them is disposed at an angle which is greater than the angle of repose of the material being processed.

As is well known to those skilled in the art, the angle of repose of granular material depends upon the size of the particles and other physical characteristics of the material such a lubricity or abrasiveness. For example, the angle of repose of course sand would be greater than the angle of repose of relatively uniformly spherical particles, such as peas. Thus, the angularity of the funnels 13 and cones 15 should be adjusted according to the material being processed so that they are positioned at angles greater than the angle of repose of such material. In general, it may be said that the combined angles of corresponding funnels 13 and cones 15 approximate a right angle when arranged according to the invention. The result of such an arrangement is that the particles of material M are repeatedly shifted to different strata in the flow of the material through the tower. Thus, for example, a particle of material which is on the surface of the deflector plate 17 and thereby at that point on the bottom strata of the material being processed will be relocated to near the top strata as the material progresses onto or into the funnel 13 immediately beneath the deflector cone 17. The particles are alternately shifted from the top toward the bottom and back toward the top again of the flow of material as they progress downwardly from chamber to chamber and into the base of the tower. In this way, all particles of material are uniformly subjected to the heating or cooling gases used in treating the material.

Assuming the material being processed is to be heated as, for example, in the processing of shale in the manufacture of brick where temperatures in the range of 1600 degrees Fahrenheit are used, gases at this temperature are delivered to each of the chambers C through its respective conduit 12 from the heat transfer chamber 11. As most clearly seen in FIGURE 1, the heat transfer chamber 11 is in the form of an enclosed loop, and may, as illustrated, be an elongated rectangle extending in parallel spaced relation to the tower 10 with the conduits 12 providing communication between respective chambers C of the tower 10 and one vertical leg 40 of the heat transfer chamber 11. The loop is completed by another vertical leg 41 joined to the leg 40 by upper and lower transverse legs 42 and 43, respectively. The shape or configuration of the enclosed loop 11 is not critical, and it may be arranged, for example, in a circle or spiral about the tower 10.

A plurality of fuel burners 44 are strategically located within the chamber 11, such as at each corner of the loop, such as shown in FIGURE 1. Each burner 44 comprises a jet nozzle 45 arranged to direct a pressurized flame along one leg of the loop. Thus, for example, the nozzle 45 in the lower left hand corner of FIGURE 1 is arranged to direct a pressurized flame upwardly along the vertical leg 40, and the nozzles at the other corners cooperate to propel the heated gases in a clockwise direction in FIGURE 1 around the loop. A supply of fuel is fed to each of the burners 44 from a suitable fuel supply 46 through a conduit 47, while air is supplied through conduit 49 from a compressor 48.

The velocity of the heated gases may be increased within the heat transfer chamber 11 by the use of venturis 50 located immediately in advance of each of the burners 44, and the volume of air delivered to the burners 44 may be controlled by adjustment of butterfly valves 51 in the conduits 49, there being a separate valve for each burner.

It is important to have a high velocity of gas generated within the heat transfer chamber 11 in order that the gases enter the processing tower 10 under sufficient velocity to pass through the material M and escape to the atmosphere from the top of the tower. Suitable control valves 52 are installed in each of the conduits 12 whereby the velocity of gases introduced into respective chambers C may be controlled as desired.

According to the design of the processing tower the only way for the gases to escape to the atmosphere is by passing through the interstices between particles of material being processed and in so doing the individual particles of material are uniformly subjected to the gases as the particles of material proceed downwardly and the gases pass upwardly along the same sinous path through the tower.

The compressor 48 is connected by a conduit 53 to the base 21 of the processing tower for the purpose of delivering a cooling air to the material M before it leaves the tower. A screen 54 is spaced from the inner surface of the wall of the base to provide room for the cooling gases entering the base through conduit 53 to circulate about and through the material in the base of the tower. The screen is of sufficiently fine gauge to prevent most of the particles of material being processed from passing through it, and those that do will not clog the conduit 53 but will pass readily out of the opening 23, assuming the valve 22 to be in the open position of FIGURE 4.

Figure 2:
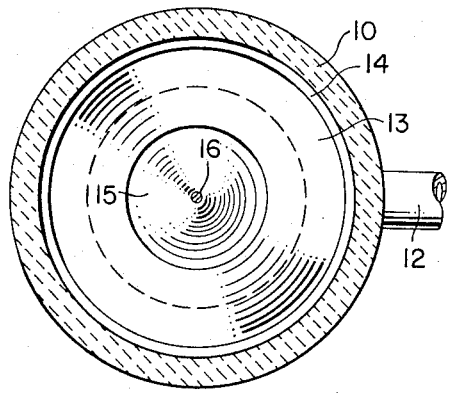
FIGURE 2 is a horizontal sectional view taken substantially along the line 2—2 in FIGURE 1.
Figure 5:
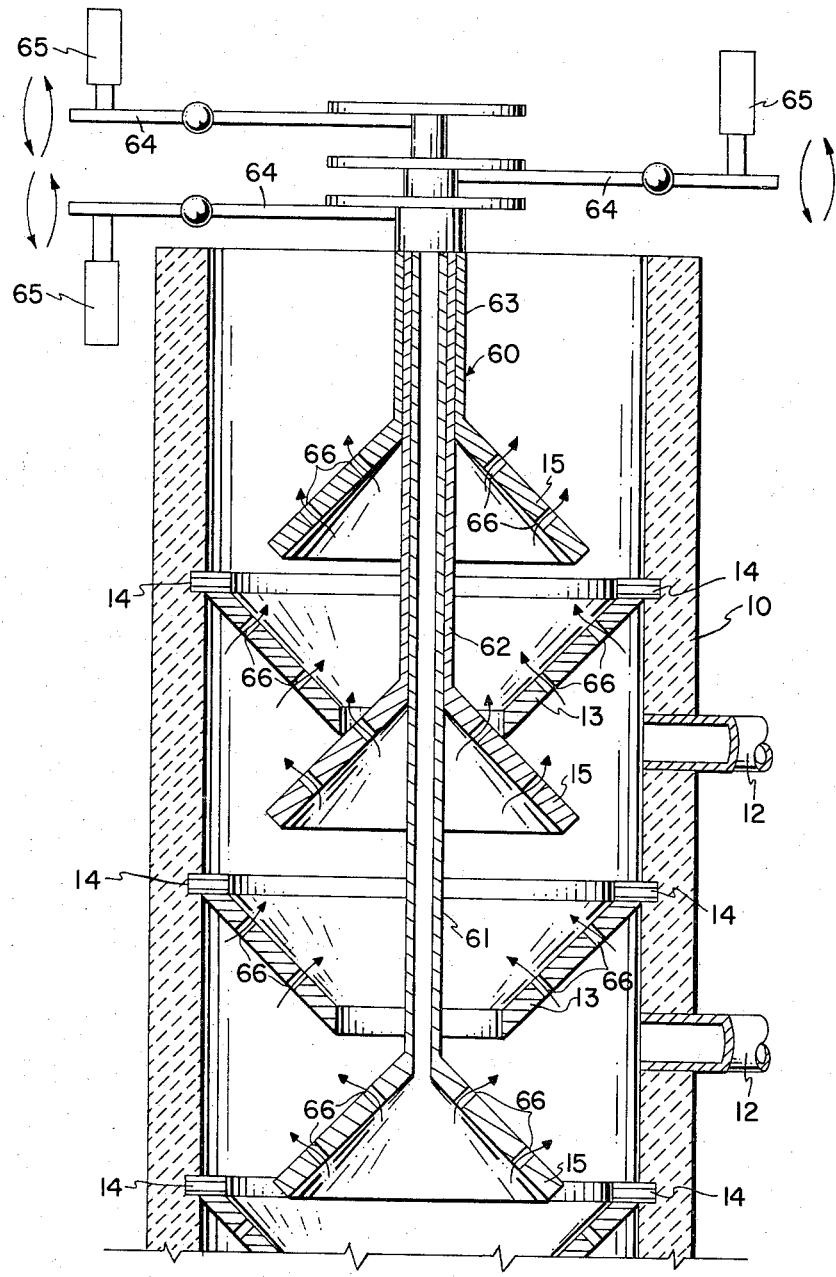
FIGURE 5 is a vertical sectional view of the upper portion of a material processing tower illustrating a further modification of the invention.

Referring to FIGURE 5, means may be provided for raising and lowering the cones 15 independently of one another instead of in unison as described in connection with the chain or cable 16 (FIGURES 1 and 2). One means of moving the cones independently is to connect each of the cones 15 to a separate component of a telescopic support 60. Thus, in FIGURE 5, the lowermost cone 15 is connected to the innermost support member 61 while the intermediate cone 15 is connected to the intermediate support member 62 and the upper cone 15 is connected to the outermost support 63.

The support members 61, 62, 63 are independently reciprocated through suitable mechanical linkage 64 by independently operable air cylinders schematically illustrated at 65. In this way the path of the particle bed can be selectively enlarged or diminished by appropriately varying the size of the openings in the base of the cones 13.

By proper adjustment of the cones 15 and the various control valves 51 and 52 a "fluidized bed" may be established. Briefly, a "fluidized bed" results when a gas is caused to flow upwardly through a bed composed of sized particles of material at a velocity sufficiently high to buoy the particles and to impart to them a violently turbulent motion, like that of a boiling liquid. The velocity of the gas must be high enough to desirably buoy the particle bed, but below that velocity which will sweep the particles out of the tower.

It is contemplated that in some instances it may be desirable to provide means whereby at least some of the gases introduced into the tower through the conduits 12 may be allowed to escape to the atmosphere without traversing the sinuous particle path defined by the arrangement of cones and funnels. One means for accomplishing this is illustrated in FIGURE 5 wherein the cones 15 are perforated as at 66 so that the gases may pass more or less freely up the center of the tower. Another means of accomplishing this is illustrated in FIGURES 3 and 4 wherein the cable 16 is replaced by a hollow rod or tube 70 having a plurality of perforations or openings 71 which provide communication between the interior of the tube 70 and the interior of the tower 10. The top of the tube 70 communicates with the atmosphere so that gases entering the tower through the conduits 12 may, after passing through at least a portion of the material M, escape to the atmosphere through the tube 70. Of course, to facilitate the exhaust of gases, the tube 70 may be combined with cones having perforations 66. Alternatively, the telescopic support 60 may be suitably perforated. Instead of an outlet, the tube 70 may be sealed from the atmosphere and connected to the heat transfer 11 whereby conditioned gases may be introduced axially of the tower as well as radially.

It is contemplated that the processing tower may be used to cool or freeze material instead of heat it, and in such instance the burners 44 may be replaced with suitable refrigeration outlets. The temperature of gases introduced to the tower may range from −320° F. to 2500° F. depending on the use to which the tower is put.

In the operation of the tower, assuming that it is desired to process shale to remove carbon at temperatures in the range of 1000 to 1600° F., wherein the shale is in a size range of 5 to 15 mesh, the heated gases from the chamber 11 are delivered through the conduits 12 and into the tower 10 under pressure in the range of 2 to 50 p.s.i. Under these conditions, and with the cones and funnels set at angles of between 20 and 60 degrees, usually about 45 degrees, the shale is satisfactorily processed to remove the carbon without the attendant dust usually associated with a fluidized bed operation. This is possible because the dust particles tend to become entrapped within the tower rather than rising to the top of the tower.

One advantage of the invention is that a predetermined quantity of material can be contained within each of the chambers C at any stage of the operation by closing the valve 22 to the position shown in FIGURES 1 and 3. After the valve 22 is closed, and assuming material continues to be delivered in the top of the tower by the conveyor 20, the uppermost chamber will fill up about the deflector cone 17 but material will stop flowing into the chambers beneath the upper chamber after the material M attains its angle of repose. In this way, the quantity of material M may be retained within the tower for a longer period of time in order to subject it to appropriately conditioned gases depending upon the nature of the processing.

It will be noted in FIGURES 1 and 3 that although the valve 22 is closed sufficiently to prevent flow of material from the tower, the lower edge of the annular flange 32 is spaced above the upper surface of the base plate 25. This is possible because the valve 22 and the cooperating base plate 25 and base 21 are constructed to take advantage of the angle of repose of granular material being processed. Arranged as shown in FIGURES 1 and 3, the valve 22 has the advantage of stopping the flow of material while at the same time providing communication between the atmosphere and the interior of the tower in situations where such an arrangement is desirable. Where desired, of course, the valve 22 may be lowered into sealing engagement with the base plate 25 by the piston 26.

Although the tower 10 is shown as being constructed of refractory material, suitable insulation may be employed in the construction depending upon the use to which the tower is to be put. Although the tower has been described as being cylindrical and employing cones and funnels, it is within the spirit of the invention to make the tower planar or rectangular and to dimension the "cones" and "funnels" to extend between the front and rear walls with the "funnels" engaging the side walls and the "cones" spaced from the side walls. Therefore, the words "cone" and "funnel" as used in the claims refer to planar as well as circular structures.

There has been set forth in the drawings and specification a preferred form of the invention wherein specific terms are employed for purposes of illustration, but not for limitation, the scope of the invention being defined in the claims.

We claim:

1. A vertically disposed material processing tower comprising means for introducing particulate material to the top of the tower, a series of funnels sealed to the tower at spaced intervals along the longitudinal axis of the tower, each funnel having an opening in the base thereof, a cone supported beneath and spaced slightly from each funnel in the operative position and movable relative to said funnel to vary the size of the opening in said funnel, means to vary the position of said cones along the longitudinal axis of the tower, wherein the cones and funnels are arranged relative to each other and to the wall of the tower to define a sinuous particle path along the upper surfaces of the cones and funnels with the openings between the cones and funnels normally filled with particles of material during operation of the tower, a chamber beneath each funnel, means to introduce conditioned gases to at least some of said chambers, and valve means to control the flow of material from the tower.

2. The processing tower of claim 1 which includes a heat transfer chamber comprising a closed loop spaced from said tower, means to introduce fluids into the loop, and means for conditioning the fluids within the loop while moving the gases in one direction about the loop.

3. A processing tower according to claim 1 wherein the upper surfaces of the cones and funnels extend at an angle greater than the angle of repose of the material being processed.

4. A processing tower according to claim 3 wherein means are provided for moving the cones relative to the funnels during processing of the material.

5. A processing tower according to claim 4 wherein the cones are movable relative to each other.

6. A processing tower according to claim 1 wherein means are provided for selectively introducing or exhausting gases axially of the tower.

7. A processing tower according to claim 2 wherein means are provided for introducing cooling gases to the base of the tower.

8. A vertically disposed material processing tower having an opening in its base through which granular material is fed by gravity, said tower including a series of funnels and cones defining a sinuous path for said material, said lowermost funnel directing the granular material toward the opening in the base, a valve comprising a base plate extending into said opening from opposite sides of the tower, an upwardly directed, substantially conical cap above the base plate, a flange on said cap in superposed relation to the base plate and spaced laterally from the opening, and means for moving the valve toward and away from the base plate within the tower, said flange on the valve cooperating with said lowermost funnel so that the flow of material through said tower may be stopped without completely closing said valve.

References Cited

UNITED STATES PATENTS

| | | | |
|---|---|---|---|
| 1,606,004 | 11/1926 | Tyler | 34—171 X |
| 2,073,553 | 3/1937 | Dienst | 34—178 X |
| 3,140,864 | 7/1964 | Lellep | 263—29 |
| 3,199,215 | 10/1965 | Jesse et al. | 34—171 X |
| 3,273,257 | 9/1966 | Johnson et al. | 34—171 X |
| 3,274,702 | 9/1966 | Kleinberg | 34—171 |

KENNETH W. SPRAGUE, *Primary Examiner.*